United States Patent
Amano et al.

(10) Patent No.: US 10,549,761 B2
(45) Date of Patent: Feb. 4, 2020

(54) AUTOMATIC TRANSMISSION AND CONTROL METHOD OF THE SAME

(71) Applicants: JATCO Ltd, Fuji-shi, Shizuoka (JP); NISSAN MOTOR CO., LTD., Yokohama-shi, Kanagawa (JP)

(72) Inventors: Norihira Amano, Fuji (JP); Youji Itou, Sagamihara (JP); Kosuke Abe, Isehara (JP)

(73) Assignees: JATCO LTD, Shizuoka (JP); NISSAN MOTOR CO., LTD., Kanagawa (JP)

( * ) Notice: Subject to any disclaimer, the term of this patent is extended or adjusted under 35 U.S.C. 154(b) by 24 days.

(21) Appl. No.: 15/758,243

(22) PCT Filed: Aug. 26, 2016

(86) PCT No.: PCT/JP2016/074998
§ 371 (c)(1),
(2) Date: Mar. 7, 2018

(87) PCT Pub. No.: WO2017/043339
PCT Pub. Date: Mar. 16, 2017

(65) Prior Publication Data
US 2018/0244284 A1 Aug. 30, 2018

(30) Foreign Application Priority Data
Sep. 11, 2015 (JP) .................... 2015-179855

(51) Int. Cl.
*F16H 61/12* (2010.01)
*F16H 59/72* (2006.01)
(Continued)

(52) U.S. Cl.
CPC .......... *B60W 50/038* (2013.01); *B60W 10/04* (2013.01); *B60W 10/107* (2013.01);
(Continued)

(58) Field of Classification Search
CPC .................... B60W 2510/107; F16H 61/12
See application file for complete search history.

(56) References Cited

U.S. PATENT DOCUMENTS 5,107,246 A * 4/1992 Mogaki .................. F16H 61/12
340/449
2004/0209719 A1 10/2004 Ochiai et al.
(Continued)

FOREIGN PATENT DOCUMENTS

JP     H11-078617 A    3/1999
JP     2004-114854 A   4/2004
(Continued)

*Primary Examiner* — Tisha D Lewis
(74) *Attorney, Agent, or Firm* — Foley & Lardner LLP

(57) ABSTRACT

An automatic transmission includes an oil temperature detecting unit configured to detect an oil temperature of the hydraulic oil, and a controller configured to perform the control of the speed ratio on a basis of the oil temperature obtained from the oil temperature detecting unit. The controller is configured such that if the controller has failed to obtain the oil temperature from the oil temperature detecting unit, the controller outputs a command to restrict an output from the driving force source, and such that if the controller has obtained the oil temperature from the oil temperature detecting unit again, the controller gradually cancels the command to restrict the output from the driving force source.

7 Claims, 4 Drawing Sheets

(51) Int. Cl.
*B60W 50/038* (2012.01)
*B60W 10/04* (2006.01)
*B60W 10/107* (2012.01)
*B60W 30/19* (2012.01)

(52) U.S. Cl.
CPC ....... *B60W 30/19* (2013.01); *B60W 2510/107* (2013.01); *B60W 2540/10* (2013.01); *B60W 2550/142* (2013.01); *B60W 2710/1005* (2013.01); *B60W 2710/1083* (2013.01)

(56) References Cited

U.S. PATENT DOCUMENTS

| | | | | |
|---|---|---|---|---|
| 2010/0195693 A1* | 8/2010 | Kitajima | ................ | F16H 61/12 374/1 |
| 2013/0116900 A1* | 5/2013 | Yuyama | ................ | F16H 59/72 701/58 |
| 2013/0275016 A1* | 10/2013 | Mitani | ................ | F16H 61/12 701/62 |

FOREIGN PATENT DOCUMENTS

| | | |
|---|---|---|
| JP | 2004-316843 A | 11/2004 |
| JP | 2006-188213 A | 7/2006 |
| JP | 2010-101264 A | 5/2010 |
| JP | 2010-203529 A | 9/2010 |

* cited by examiner

AUTOMATIC TRANSMISSION AND CONTROL METHOD OF THE SAME

TECHNICAL FIELD

The present invention relates to an automatic transmission in which shift is controlled by hydraulic pressure.

BACKGROUND ART

With an automatic transmission in which shift is controlled by hydraulic pressure of hydraulic oil, since the hydraulic oil changes the viscosity and the fluidity depending on a temperature, an oil temperature sensor to detect the oil temperature of the hydraulic oil is provided, and the shift is controlled according to the oil temperature.

Here, since an abnormal oil temperature sensor cannot correctly detect the oil temperature and therefore a speed ratio cannot be accurately controlled, there has been known a shift control device (see JP2010-203529A) that restricts a shift speed and a shift range.

SUMMARY OF INVENTION

The technique described in JP2010-203529A reduces a shift control while an oil temperature sensor is abnormal. There may be a case where the technique performs a control to reduce a torque of a driving force source, not only the shift control, while the oil temperature sensor is abnormal.

In such control, for example, when the oil temperature sensor recovers from a temporal abnormality, such as a temporal poor contact of a connector, to a normal state again, since the reduced control during abnormality returns to the normal control, a behavior of a vehicle changes, possibly giving uncomfortable feeling to a driver. Especially, while the driver requests acceleration, a sudden acceleration possibly occurs when the control returns to normal.

The present invention has been made in consideration of such problem and the object is to ensure reducing a change in behavior of a vehicle even when an oil temperature sensor temporarily becomes abnormal.

According to one aspect of this invention, an automatic transmission to which a rotation of a driving force source is input, the automatic transmission where a speed ratio is controlled on a basis of hydraulic pressure of hydraulic oil, the automatic transmission includes an oil temperature detecting unit configured to detect an oil temperature of the hydraulic oil, and a controller configured to perform the control of the speed ratio on a basis of the oil temperature obtained from the oil temperature detecting unit, wherein the controller is configured such that if the controller has failed to obtain the oil temperature from the oil temperature detecting unit, the controller outputs a command to restrict an output from the driving force source, and such that if the controller has obtained the oil temperature from the oil temperature detecting unit again, the controller gradually cancels the command to restrict the output from the driving force source.

According to another aspect of this invention, a control method of automatic transmission to which a rotation of a driving force source is input, the automatic transmission where a speed ratio is controlled on a basis of hydraulic pressure of hydraulic oil, the control method includes obtaining an oil temperature of the hydraulic oil, performing the control of the speed ratio on a basis of the obtained oil temperature, outputting a command to restrict an output from the driving force source if the obtaining the oil temperature has failed, and gradually canceling the command to restrict the output from the driving force source if the oil temperature has been obtained again.

According to these aspects, if the oil temperature cannot be obtained from the oil temperature detecting unit, the output from the driving force source is restricted. Afterwards, if the oil temperature has been obtained from the oil temperature detecting unit again, the command to restrict the output from the driving force source is gradually canceled. Accordingly, sudden acceleration of the vehicle due to the sudden cancel of the restriction on the output from the driving force source can be prevented.

DESCRIPTION OF EMBODIMENTS

The following describes an embodiment of the present invention with reference to the accompanying drawings.

Figure 1:
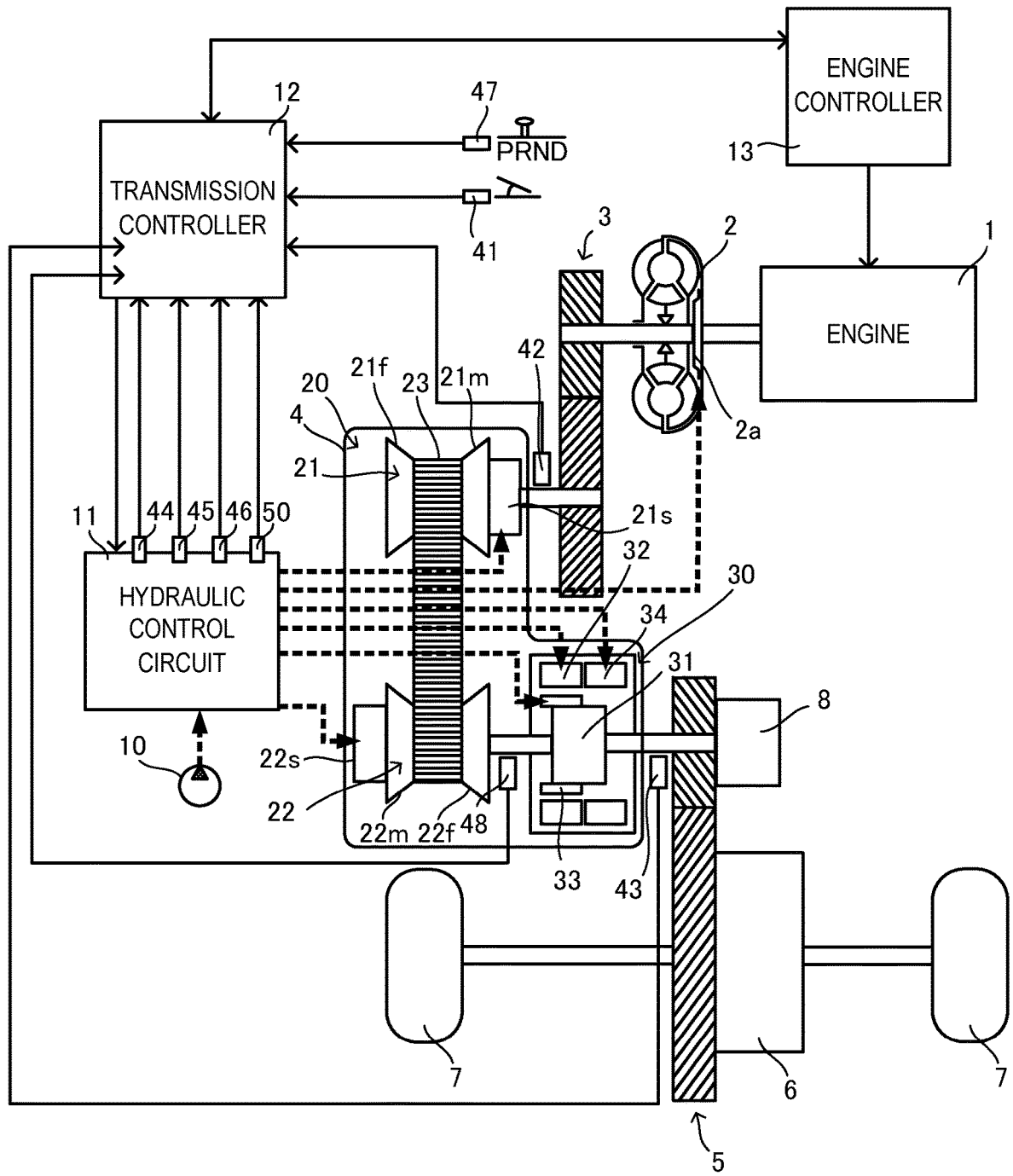
FIG. 1 is an explanatory drawing illustrating a configuration of a vehicle that includes an automatic transmission according to an embodiment of the present invention.

FIG. 1 is a schematic configuration diagram of a vehicle on which a belt continuously variable transmission according to the embodiment of the present invention is mounted. This vehicle includes an engine 1 as a driving force source. Output rotation of the engine 1 is transmitted to a driving wheel 7 via a torque converter 2, a first gear train 3, a transmission 4, a second gear train 5, and a differential gear 6. A parking mechanism 8 that mechanically unrotatably locks an output shaft of the transmission 4 in parking is disposed on the second gear train 5.

The engine 1 is an internal combustion engine such as a gasoline engine and a diesel engine. An engine controller 13 controls a rotation speed and a torque of the engine.

The torque converter 2 includes a lock-up clutch 2a. If the lock-up clutch 2a is engaged, slip at the torque converter 2 disappears, ensuring improving transmission efficiency of the torque converter 2.

The vehicle includes an oil pump 10 that is driven by using a part of power of the engine 1, a hydraulic control circuit 11 that regulates hydraulic pressure from the oil pump 10 to supply the hydraulic pressure to each part of the transmission 4, and a transmission controller 12 that controls the hydraulic control circuit 11.

The transmission 4 is a continuously variable transmission including a variator 20 and a sub-transmission mechanism 30 disposed in series with respect to the variator 20. "[D]isposed in series" means that the variator 20 and the sub-transmission mechanism 30 are disposed in series in a power transmission path from the engine 1 up to the driving wheel 7. In this example, while the sub-transmission mechanism 30 is disposed at an output side of the variator 20, the sub-transmission mechanism 30 may be disposed at an input side of the variator 20.

The variator 20 is a continuously variable transmission mechanism including a primary pulley 21, a secondary pulley 22, and a belt 23 stretched around the pulleys 21 and 22. The pulleys 21 and 22 include fixed conical plates 21*f* and 22*f*, movable conical plates 21*m* and 22*m* disposed in a state where sheave surfaces are opposed to the fixed conical plates 21*f* and 22*f* to form grooves with the fixed conical plates 21*f* and 22*f*, and hydraulic cylinders 21*p* and 22*p* disposed at back surfaces of the movable conical plates 21*m* and 22*m* to axially displace the movable conical plates 21*m* and 22*m*, respectively.

Adjusting hydraulic pressure (a primary pressure Ppri and a secondary pressure Psec) supplied to the pulleys 21 and 22 changes force that the pulleys 21 and 22 sandwich the belt 23 to change a torque capacity (a transmissive maximum torque) of the variator 20, and changes a groove width to change contact radiuses of the belt 23 and the respective pulleys 21 and 22, thus a speed ratio of the variator 20 steplessly changes.

The sub-transmission mechanism 30 is a transmission mechanism having two stages for forward and one stage for backward. The sub-transmission mechanism 30 includes a Ravigneaux type planetary gear mechanism 31 where carriers of two planetary gears are coupled, and a plurality of friction elements 32 to 34 (a Low brake 32, a High clutch 33, and a Rev brake 34). Adjusting hydraulic pressure supplied to the friction elements 32 to 34 to change engagement states of the friction elements 32 to 34 changes a gear position of the sub-transmission mechanism 30.

The transmission controller 12 includes a CPU, a storage device including a RAM and a ROM, input/output interfaces, and a bus that mutually couples them.

Various signals are input to the transmission controller 12 via the input/output interfaces. The input signals include the following signals:

A signal from an accelerator pedal opening sensor 41 that detects an accelerator pedal opening APO indicative of a manipulated variable of an accelerator pedal A signal from a primary rotational speed sensor 42 that detects a primary rotation speed Npri as a rotation speed of the primary pulley 21

A signal from an output rotational speed sensor 43 that detects an output rotation speed ($\infty$ vehicle speed) of the transmission 4

A signal from a line pressure sensor 44 that detects a line pressure PL

A signal from a primary pressure sensor 45 that detects the primary pressure Ppri A signal from a secondary pressure sensor 46 that detects the secondary pressure Psec A signal from an inhibitor switch 47 that detects a position of a select lever A signal from a secondary rotational speed sensor 48 that detects a secondary rotation speed Nsec as a rotation speed of the secondary pulley 22

A signal from an oil temperature sensor 50 that detects the oil temperature of the transmission 4

A signal indicative of operating states (the rotation speed and the torque) of engine 1 from the engine controller 13

The storage device of the transmission controller 12 stores a shift control program of the transmission 4 and a shift map used in this shift control program. The transmission controller 12 reads the shift control program stored in the storage device to cause the CPU to execute this shift control program, thus performing a predetermined arithmetic process to a signal input via the input interface. The transmission controller 12 sets an instruction pressure of the hydraulic pressure supplied to each part of the transmission 4 and outputs the set instruction pressure to the hydraulic control circuit 11 via the input/output interfaces. The transmission controller 12 outputs an engine control signal (for example, a torque down request) to the engine controller 13 as necessary.

The hydraulic control circuit 11 includes a plurality of flow paths and a plurality of hydraulic control valves. The hydraulic control circuit 11 controls the plurality of hydraulic control valves on the basis of the instruction pressure from the transmission controller 12 to switch a supply passage of the hydraulic pressure and generates the hydraulic pressure according to the instruction pressure to supply the hydraulic pressure to each part of the transmission 4. This performs a shift of the variator 20, the change of the gear position of the sub-transmission mechanism 30, capacity control of the respective friction elements 32 to 34, and an engagement or a disengagement of the lock-up clutch 2*a*.

The following describes the control of the transmission controller 12 according to the oil temperature in the thus configured transmission 4.

The transmission controller 12 controls the transmission 4 on the basis of the oil temperature obtained from the oil temperature sensor 50. Since, with the hydraulic oil of the transmission 4 at a low temperature, the viscosity increases while the fluidity decreases, responsiveness to a control target is deteriorated with the low oil temperature of the hydraulic oil. Therefore, the transmission controller 12 performs a control according to the oil temperature of the hydraulic oil detected by the oil temperature sensor 50.

Especially, the viscosity of the hydraulic oil increases at the low oil temperature (for example, below zero); therefore, there is a possibility that the responsiveness of the friction engaging elements is deteriorated and torque transmission efficiency of the transmission 4 is deteriorated. In such case, the transmission controller 12 controls the behavior of the transmission 4, such as reduction of the shift speed and restriction of a shift range of the variator 20. The transmission controller 12 executes an instruction (a torque down request) to restrict an output torque to the engine 1 as the driving force source in addition to the control of the transmission 4 at the low oil temperature.

When the oil temperature is higher than a cooling water temperature of the engine 1 as well, in the case of a large load, such as a large torque being input to the transmission 4, there is a possibility that the hydraulic oil and the friction engaging elements are deteriorated. In such case as well, the transmission controller 12 requests a torque-down to the engine 1.

If the oil temperature cannot be obtained from the oil temperature sensor 50 in the control according to the oil temperature, the transmission controller 12 performs the following control.

If the transmission controller 12 cannot obtain the oil temperature from the oil temperature sensor 50 due to, for example, a fault in the oil temperature sensor 50 and poor contact of a harness and a connector coupled to the oil temperature sensor 50, the transmission controller 12 estimates the oil temperature by another method.

When the engine 1 has just been started (within a predetermined period from the start of the engine 1) and the engine water temperature is low (for example, below zero), the oil temperature of the hydraulic oil is also estimated to be low. The predetermined period is defined until completion of warming-up of the engine 1 (for example, several to several ten minutes). The engine water temperature is obtained from the engine controller 13. As described above, considering a margin for the deterioration of efficiency of the transmission 4 at the low oil temperature, the oil temperature is estimated as the lowest value among the assumed temperatures.

Meanwhile, when the warming-up of the engine 1 is completed and the engine water temperature becomes the predetermined water temperature (for example, 90° C.), the oil temperature of the hydraulic oil is estimated to be sufficiently high.

Thus, while the transmission controller 12 performs the control according to the oil temperature detected by the oil temperature sensor 50, if the oil temperature sensor 50 cannot detect the oil temperature, the transmission controller 12 performs the control according to the estimated value of oil temperature.

Here, the case where the oil temperature sensor 50 cannot detect the oil temperature but can detect the oil temperature again while the transmission controller 12 performs the control according to the estimated value of oil temperature is examined.

As one example, the case where after the signal from the oil temperature sensor 50 cannot be temporarily transmitted due to such as a poor contact, the conduction is restored and the signal from the oil temperature sensor 50 can be transmitted again is assumed.

In such case, if the transmission controller 12 has obtained the oil temperature from the oil temperature sensor 50 after the control according to the estimated value of oil temperature, the transmission controller 12 changes the control to the control according to the obtained oil temperature.

Figure 2:
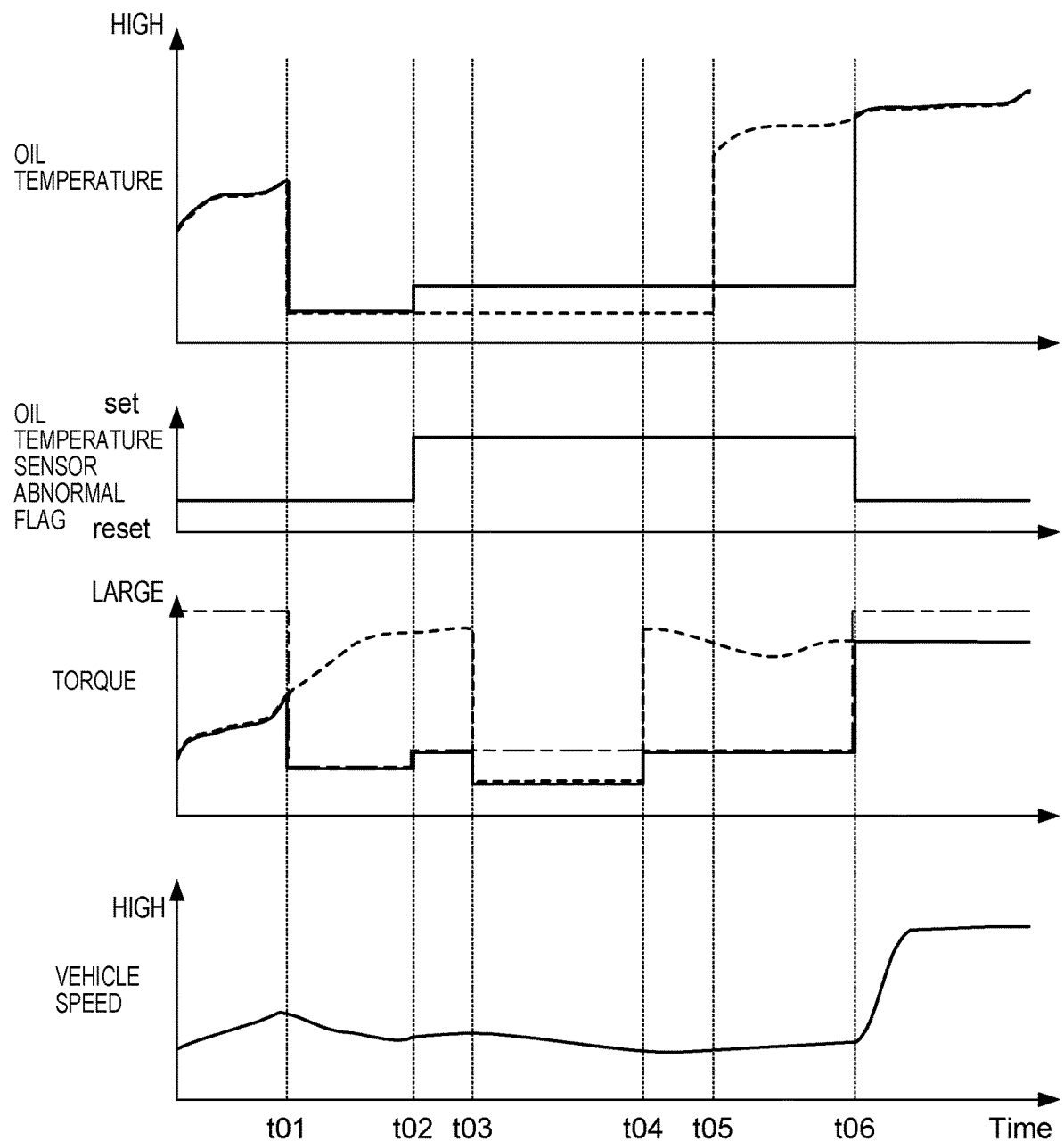
FIG. 2 is a timing chart for control of a transmission executed according to an oil temperature according to the embodiment of the present invention.

FIG. 2 is a timing chart for the control of the transmission 4 performed by the transmission controller 12 according to this embodiment according to the oil temperature.

FIG. 2 illustrates, from the upper stage, the oil temperature, an oil temperature sensor abnormal flag, a torque, and a vehicle speed as respective timing charts with a time as the horizontal axis.

Regarding the oil temperature, the value of the oil temperature transmitted from the oil temperature sensor 50 is indicated by the dotted line and the oil temperature (any of the oil temperature from the oil temperature sensor 50 and the estimated value of the oil temperature) used by the transmission controller 12 for control is indicated by the solid line.

The oil temperature sensor abnormal flag is set when the transmission controller 12 determines that the oil temperature sensor 50 is abnormal and is reset when the oil temperature sensor 50 is not determined as abnormal.

Regarding the torque, a request torque on the basis of an operation of an accelerator pedal by a driver is indicated by the dotted line, the command value of the torque down request of the transmission controller 12 is indicated by the one dot chain line, and the output torque actually output from the engine 1 is indicated by the solid line.

The transmission controller 12 determines the speed ratio of the transmission 4 according to, for example, the input rotation speed, the vehicle speed, and the torque request to perform the shift control. At this time, the control according to the oil temperature obtained from the oil temperature sensor 50 is performed.

At a timing t01, when a signal level indicative of the oil temperature output from the oil temperature sensor 50 becomes the minimum due to a cause such as a fault of the oil temperature sensor 50, the transmission controller 12 detects the oil temperature as the lowest state on the basis of the input signal. The transmission controller 12 instructs the torque down request to the engine 1 according to the detected low oil temperature.

The driver depresses the accelerator pedal to request the request torque (the dotted line) to the engine 1. Here, when the transmission controller 12 instructs the torque down request (the one dot chain line), the engine controller 13 compares the request torque indicated by the dotted line with the command value of the torque down request indicated by the one dot chain line and selects any ones of the smaller one as the output torque. Consequently, the engine 1 outputs the output torque indicated by the solid line.

When the signal level output from the oil temperature sensor 50 does not change for equal to or more than a predetermined period, the transmission controller 12 determines that the oil temperature sensor 50 is abnormal and cannot correctly detect the oil temperature. The predetermined period is defined, for example, several seconds.

The transmission controller 12 determines that the oil temperature sensor 50 is abnormal at a timing t02 and sets the oil temperature sensor abnormal flag. With the oil temperature sensor abnormal flag set, the transmission controller 12 estimates the oil temperature on the basis of the engine water temperature or a similar value, instead of the signal output from the oil temperature sensor 50, and uses the estimated oil temperature for control.

In the example illustrated in FIG. 2, since the estimated value of the oil temperature (indicated by the solid line) becomes a low value at and after a timing t02, the transmission controller 12 continuously instructs the torque down request to the engine 1. The engine 1 outputs the output torque indicated by the solid line on the basis of the command value of the torque down request.

Furthermore, in the example illustrated in FIG. 2, by the driver returning the accelerator pedal, the request torque temporarily falls below the command value of the torque down request between a timing t03 and a timing t04. In this case, the request torque smaller than the command value of the torque down request is output (indicated by the solid line).

Afterwards, at a timing t05, assume that the oil temperature sensor 50 recovers from the abnormality and the oil temperature sensor 50 outputs the correct signal.

In this case, the transmission controller 12 determines that the oil temperature sensor 50 is normal if the signal level output from the oil temperature sensor 50 changes for equal to or more than the predetermined period. The predetermined period is defined, for example, several seconds as described above.

When the predetermined period passes at a timing t06 and the oil temperature sensor 50 is determined as normal, the transmission controller 12 resets the oil temperature sensor abnormal flag. In this case, the transmission controller 12 performs the control according to the oil temperature output from the oil temperature sensor 50.

When the oil temperature sensor 50 becomes normal from abnormal, the transmission controller 12 switches the control from the control according to the estimated oil temperature to the control according to the detected oil temperature by the oil temperature sensor 50. At this time, the following problem occurs when the estimated value of the oil temperature differs from the detected oil temperature.

When the estimated value of the oil temperature is lower or higher, the transmission controller 12 instructs the torque down request to the engine 1. In the case where the transmission controller 12 obtains the oil temperature from the oil temperature sensor 50 again, the obtained oil temperature differs from the estimated value, and the oil temperature becomes out of the range in which the torque down request is performed, the torque down request to the engine 1 is canceled.

At this time, when the driver keeps depressing the accelerator pedal intending for acceleration, the cancel of the torque down request increases the driving force by the engine 1, possibly causing sudden acceleration. The increase in vehicle speed from the timing t06 in FIG. 2 suggests this.

This embodiment performs the following control to reduce such sudden acceleration.

Figure 3:
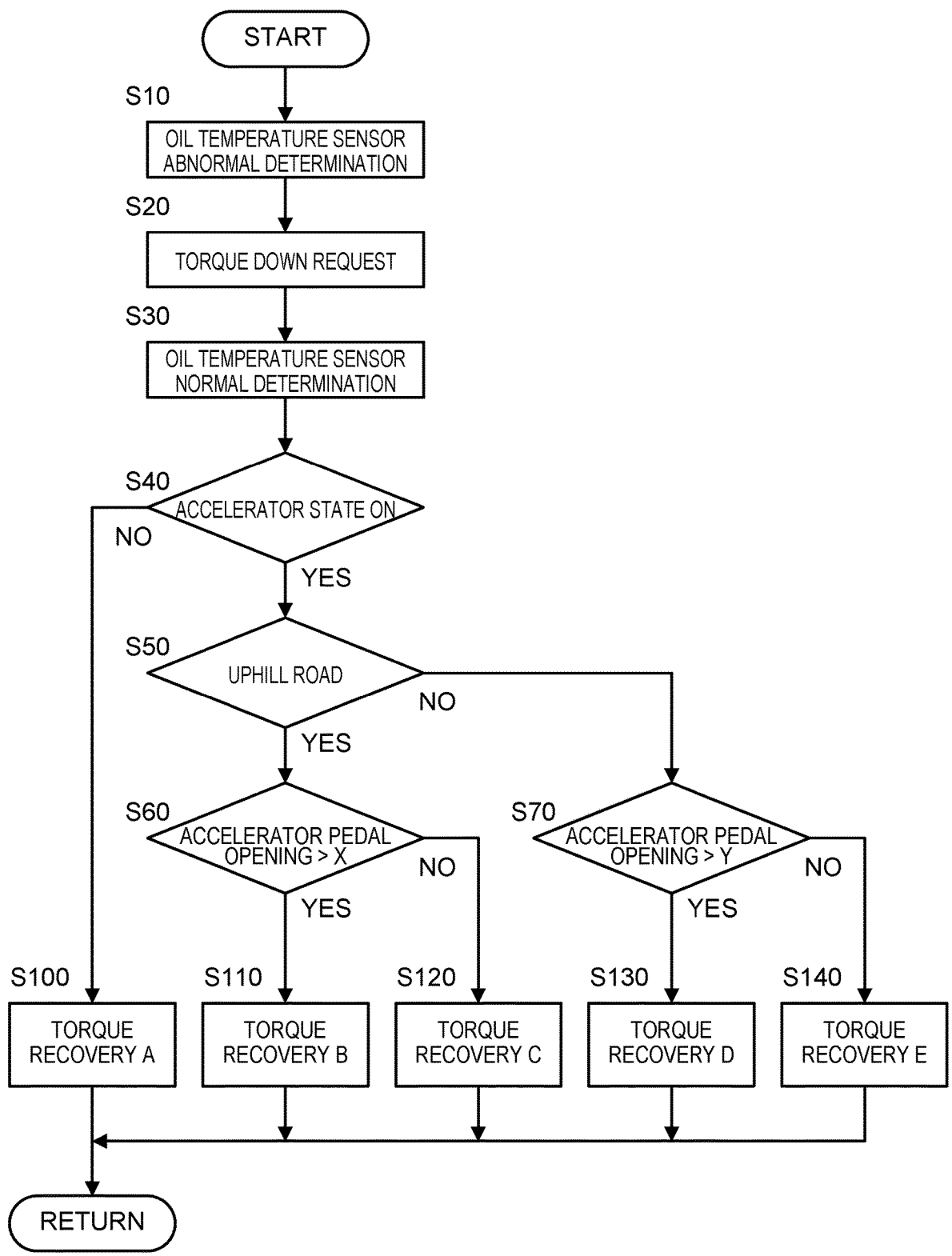
FIG. 3 is a flowchart for a control by a transmission controller according to the embodiment of the present invention.

FIG. 3 is a flowchart for the control executed by the transmission controller 12 according to this embodiment.

The transmission controller 12 executes the flowchart illustrated in FIG. 3 at predetermined cycles (for example, 10 ms).

When the signal level output from the oil temperature sensor 50 does not change for equal to or more than the predetermined period at Step S10, the transmission controller 12 determines that the oil temperature sensor 50 is abnormal and sets the oil temperature sensor abnormal flag.

When the oil temperature sensor abnormal flag is set, the transmission controller 12 instructs the torque down request of the engine 1 to the engine controller 13 at Step S20.

Afterwards, at Step S30, when the transmission controller 12 determines that the oil temperature sensor 50 transmits the normal signal by the signal output from the oil temperature sensor 50, the transmission controller 12 determines that the oil temperature sensor 50 is normal and resets the oil temperature sensor abnormal flag.

Next, the transmission controller 12 determines whether the accelerator pedal has been depressed by the driver at the timing of Step S30 or not (whether the accelerator state is ON or not).

When it is determined that the accelerator state is not ON, the step transitions to Step S100 and the transmission controller 12 executes a torque recovery process A. The torque recovery process will be described later.

When the accelerator state is determined as ON, the step transitions to Step S50, and the transmission controller 12 determines whether a gradient of a current road surface is an uphill road or not. Whether the road surface is the uphill road or not may be determined by providing a gradient sensor in the vehicle or may be obtained through a calculation from the output torque from the engine 1, the vehicle speed, and the speed ratio. Whether the road surface is the uphill road or not is determined by, for example, the gradient of the road surface is equal to or more than several percent or not.

When the road surface is determined as the uphill road, the step transitions to Step S60, and the transmission controller 12 determines whether the current accelerator pedal opening APO is larger than a predetermined opening X or not. The predetermined opening X is defined as the accelerator pedal opening APO intending to further accelerate the vehicle overcoming a resistance of the gradient on the uphill road.

When the accelerator pedal opening APO is larger than the predetermined opening X, the step transitions to Step S110, and the transmission controller 12 executes a torque recovery process B. When the accelerator pedal opening APO is equal to or less than the predetermined opening X, the step transitions to Step S120, and the transmission controller 12 executes a torque recovery process C.

When the road surface is determined as not the uphill road at Step S50, the step transitions to Step S70, and the transmission controller 12 determines whether the current accelerator pedal opening APO is larger than a predetermined opening Y or not.

When the accelerator pedal opening APO is larger than the predetermined opening Y, the step transitions to Step S130, and the transmission controller 12 executes a torque recovery process D. When the accelerator pedal opening APO is equal to or less than the predetermined opening Y, the step transitions to Step S120, and the transmission controller 12 executes a torque recovery process E.

It should be noted that, the predetermined opening Y is an opening smaller than the predetermined opening X. Even when the driver requests the identical acceleration, the acceleration on the uphill road requires the larger accelerator pedal opening APO. Therefore, the predetermined opening X is set as a value including the resistance on the uphill road relative to the predetermined opening Y.

After any of processes of these torque recovery processes A to E, this flowchart is terminated and the process returns to another process.

The following describes the torque recovery processes A to E.

The torque recovery process A is a process when the accelerator is not ON when the oil temperature sensor 50 becomes normal, that is, the process when the driver does not request the torque.

In this case, it is unnecessary to immediately cancel the torque down request. Therefore, to cancel the torque down request, the torque recovery process A recovers the command value of the torque down request to a level at which the torque down request is not performed at the gentlest gradient (a time change rate of torque [Nm/sec]) compared with the other torque recovery processes described later.

The torque recovery process B is a process in the state of the accelerator being ON when the oil temperature sensor 50 becomes normal, the road surface is the uphill road, and the accelerator pedal opening APO is larger than the predetermined opening X.

In this case, since the torque request from the driver is large and the torque to maintain the vehicle speed is required due to the resistance on the uphill road, it is necessary to promptly cancel the torque down request and output the request torque from the engine 1 after the oil temperature sensor 50 recovers normally. Therefore, the torque recovery process B recovers the command value of the torque down request by the steepest gradient compared with the other processes.

The torque recovery process C is a process in the state of the accelerator being ON when the oil temperature sensor 50 becomes normal and the accelerator pedal opening APO is equal to or less than the predetermined opening X while the road surface is the uphill road.

In this case, although the torque request from the driver is not large, since the resistance on the uphill road requires the torque to maintain the vehicle speed, the torque down request needs to be promptly canceled after the oil temperature sensor 50 recovers normally. Therefore, while the torque recovery process C recovers the command value of the torque down request at a comparatively steep gradient, the torque recovery process C recovers the command value at a gradient gentler than the torque recovery process B to reduce the sudden acceleration during the torque recovery. It should be noted that, not only the determination on whether the road surface is the uphill road or not, the cancel of the torque down request may be configured to be quicker as the degree of the uphill road becomes large according to the degree of the uphill road (according to the magnitude of the gradient of the road surface).

The torque recovery process D is a process in the state of the accelerator being ON when the oil temperature sensor 50 becomes normal, the road surface is not the uphill road, and the accelerator pedal opening APO is larger than the predetermined opening Y.

In this case, although the road surface is a flat road, since the request torque from the driver is large, the torque down request needs to be promptly canceled after the oil temperature sensor 50 recovers normally. Therefore, the torque recovery process D recovers the command value of the torque down request at a comparatively steep gradient. While the gradient at this time is steeper than the torque recovery process C, the torque recovery process D recovers the command value at the gradient gentler than the torque recovery process B to reduce the sudden acceleration during the torque recovery.

The torque recovery process E is a process in the state of the accelerator being ON when the oil temperature sensor 50 becomes normal, the road surface is not the uphill road, and the accelerator pedal opening APO is equal to or less than the predetermined opening Y.

In this case, since the road surface is the flat road and the request torque from the driver is not large, the torque recovery process E recovers the command value of the torque down request at a gradient gentler than the torque recovery process D to reduce the sudden acceleration during the torque recovery after the oil temperature sensor 50 recovers normally.

Thus, in this embodiment, the torque recovery processes, which recover the torque down request when the oil temperature sensor 50 determined as a fault becomes normal, controls the gradient (the time change rate of the torque) of recovering the control value of the torque down request on the basis of the accelerator pedal opening APO and the gradient of the road surface.

Such control ensures restricting the acceleration of the vehicle caused by the sudden cancel of the torque down request and also ensures maintaining the vehicle with the small restriction of acceleration when the torque is required. Especially, this ensures preventing the vehicle from stopping and retreating due to the torque down request on the uphill road and also ensures improving restartability.

Figure 4:
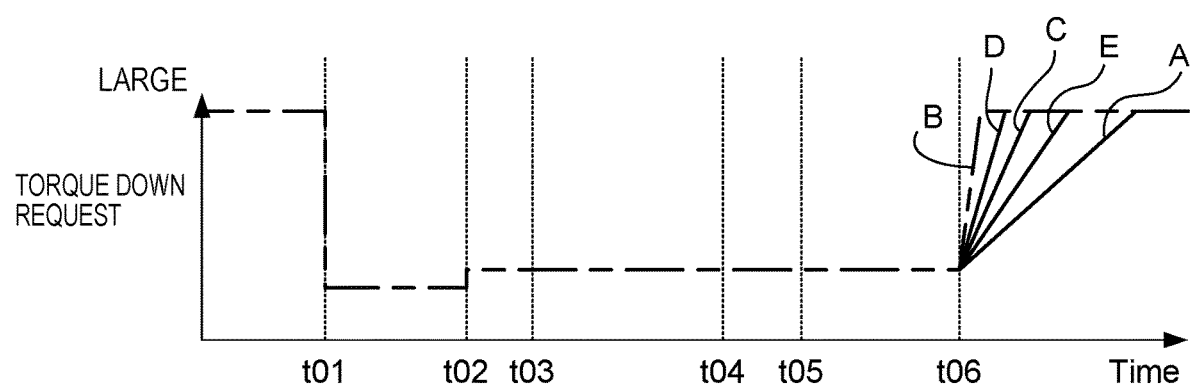
FIG. 4 is a timing chart illustrating a time change of a command value of a torque down request according to the embodiment of the present invention.

FIG. 4 is an explanatory drawing illustrating the torque recovery process executed by the transmission controller 12 according to this embodiment.

FIG. 4 is a timing chart illustrating the time change of the command value of the torque down request according to this embodiment and corresponding to FIG. 2.

When the oil temperature sensor 50 becomes the normal state from the abnormal state, the transmission controller 12 cancels the torque down request. At this time, as described in FIG. 2, when the torque down request is suddenly canceled, the output torque of the engine 1 suddenly rises up and the vehicle is suddenly accelerated in some cases.

Meanwhile, in the case of the road surface being the uphill road, when the output torque of the engine 1 is restricted, the vehicle stops and the restarts after the stop becomes difficult, possibly causing a retreat of the vehicle. In such case, the output torque of the engine 1 needs to be increased immediately.

Therefore, as described in FIG. 3, the gradient of the command value when the torque down request is canceled is controlled on the basis of the accelerator pedal opening APO by the driver and the gradient of the road surface.

The torque recovery process B recovers the command value of the torque down request at the steepest gradient, the gradient becomes gentle in the order of the torque recovery process D, the torque recovery process C, and the torque recovery process E, and the torque recovery process A recovers the command value of the torque down request at the gentlest gradient.

It should be noted that, while in this embodiment, the transmission controller 12 changes the command value of the torque down request so as to be gradually canceled at the predetermined gradient (the time change rate of the torque) in the torque recovery processes, this should not be construed in a limiting sense. The command value of the torque down request may be changed in a stepped manner of several stages, or the command value of the torque down request may be changed so as to form a curved line. The time change rate in the process of change the command value of the torque down request may be determined on the basis of the accelerator pedal opening APO and the uphill road.

As described above, with the embodiment of the present invention, the rotation of the engine 1 as the driving force source is input to the transmission 4. In the transmission 4, the speed ratio is controlled on the basis of the hydraulic pressure of the hydraulic oil. The transmission 4 includes the oil temperature sensor 50 as an oil temperature detecting unit configured to detect the oil temperature of the hydraulic oil and the transmission controller 12 configured to perform the control of the speed ratio on the basis of the oil temperature obtained from the oil temperature sensor 50. The transmission controller 12 is configured such that if the transmission controller 12 fails to obtain the oil temperature from the oil temperature sensor 50, the transmission controller 12 outputs the command (the torque down request) to restrict the output from the engine 1. The transmission controller 12 is configured such that if the transmission controller 12 has obtained the oil temperature from the oil temperature sensor 50 again, the transmission controller 12 gradually cancels the command (the torque down request) to restrict the output from the engine 1.

With such configuration, the embodiment of the present invention restricts the output from the engine 1 by the torque down request when the oil temperature sensor 50 has failed to obtain the oil temperature, and when the oil temperature sensor 50 has obtained the oil temperature again afterwards, the embodiment gradually cancels the torque down request. Therefore, this embodiment ensures restricting the acceleration of the vehicle caused by the sudden cancel of the restriction on the output from the engine 1 when the oil temperature has been obtained again from the oil temperature sensor 50.

Additionally, the embodiment of the present invention is configured such that when the transmission controller 12 has obtained the oil temperature again from the oil temperature sensor 50, the cancel of the torque down request is quickened as the request torque to the engine 1 becomes large.

With such configuration, in the case where the torque request of the engine 1 is large such as the driver's request of the acceleration and the road surface being the uphill road, performing the cancel of torque down request quick ensures promptly restarting and accelerating the vehicle after the torque down request is canceled.

Additionally, when the transmission controller 12 has obtained the oil temperature again from the oil temperature sensor 50, the embodiment of the present invention is configured to quicken the cancel of the torque down request as the accelerator pedal opening APO becomes large.

With such configuration, as the accelerator pedal opening APO by the driver becomes large and as the request of the acceleration becomes large, the cancel of the torque down request is quickened. This ensures promptly restarting and accelerating the vehicle after the cancel of the torque down request.

The embodiment of the present invention is configured such that the cancel of the torque down request is quickened as the gradient of the uphill road becomes steep when the transmission controller 12 has obtained the oil temperature again from the oil temperature sensor 50.

Such configuration reduces the stop and the retreat of the vehicle by the torque down request on the uphill road by quickening the cancel of the torque down request and allows the vehicle to promptly restart and accelerate after the torque down request is canceled.

The embodiment of the present invention is configured such that when the signal indicative of the change in oil temperature from the oil temperature sensor 50 continues for equal to or more than the predetermined period, the transmission controller 12 determines that the oil temperature has been obtained again.

Such configuration allows the determination of the normal recovery of the oil temperature sensor 50 by the signal indicative of the normal oil temperature from the oil temperature sensor 50 continuing for equal to or more than the predetermined period and allows the cancel of the torque down request at the timing at which the oil temperature sensor 50 recovers normally. This effect corresponds to claim 5.

The embodiment of the present invention described above is merely illustration of one application example of the present invention and not of the nature to limit the technical scope of the present invention to the specific constructions of the embodiment.

While the embodiment includes the belt continuously variable transmission mechanism as the variator 20, the variator 20 may be a continuously variable transmission mechanism where the chain is wound around over the pulleys 21, 22 instead of the V belt 23. Alternatively, the variator 20 may be a toroidal type continuously variable transmission mechanism where a tiltable power roller is disposed between an input disk and an output disk.

While the embodiment describes the example that the engine 1 as the internal combustion engine is provided as the driving force source, the configuration is not limited to this. The embodiment is similarly applicable to an electric vehicle using an electric motor as the driving force source and a hybrid vehicle using both an engine and an electric motor as the driving force sources.

With respect to the above description, the contents of application No. 2015-179855, with a filing date of Sep. 11, 2015 in Japan, are incorporated herein by reference.

The invention claimed is:

1. An automatic transmission to which a rotation of a driving force source is input, a speed ratio of the automatic transmission being controlled on a basis of hydraulic pressure of hydraulic oil, the automatic transmission comprising:
   an oil temperature sensor configured to detect an oil temperature of the hydraulic oil; and
   a controller configured to perform control of the speed ratio on a basis of the oil temperature obtained from the oil temperature sensor, wherein
   the controller is configured such that:
      when the controller has failed to obtain the oil temperature from the oil temperature sensor due to an abnormality of the oil temperature sensor, the controller outputs a command to restrict an output from the driving force source; and
      when the controller has obtained the oil temperature from the oil temperature sensor after the oil temperature sensor has recovered from the abnormality, the controller gradually cancels the command to restrict the output from the driving force source.

2. The automatic transmission according to claim 1, wherein
   the controller is configured such that when the controller has obtained the oil temperature from the oil temperature sensor after the oil temperature sensor has recovered from the abnormality, the controller quickens the cancellation of the command to restrict the output from the driving force source as a request torque to the driving force source becomes larger than a predetermined amount.

3. The automatic transmission according to claim 2, wherein
   the controller is configured such that when the controller has obtained the oil temperature from the oil temperature sensor after the oil temperature sensor has recovered from the abnormality, the controller quickens the cancellation of the command to restrict the output from the driving force source as an accelerator pedal opening becomes larger than a predetermined opening.

4. The automatic transmission according to claim 2, wherein
   the controller is configured such that when the controller has obtained the oil temperature from the oil temperature sensor after the oil temperature sensor has recovered from the abnormality, the controller quickens the cancellation of the command to restrict the output from the driving force source as a gradient of an uphill road increases in steepness.

5. The automatic transmission according to claim 1, wherein
   the controller is configured such that when a signal indicative of a change in the oil temperature from the oil temperature sensor continues for equal to or more than a predetermined period, the controller determines that the oil temperature has been obtained after recovering from the failure.

6. A control method of automatic transmission to which a rotation of a driving force source is input, a speed ratio of the automatic transmission being controlled on a basis of hydraulic pressure of hydraulic oil, the control method comprising:
   obtaining an oil temperature of the hydraulic oil;
   performing control of the speed ratio on a basis of the obtained oil temperature;
   outputting a command to restrict an output from the driving force source when the oil temperature is not obtained due to a failure in obtaining the oil temperature; and
   gradually canceling the command to restrict the output from the driving force source when the oil temperature has been obtained after recovering from the failure in obtaining the oil temperature.

7. An automatic transmission to which a rotation of a driving force source is input, a speed ratio of the automatic transmission being controlled on a basis of hydraulic pressure of hydraulic oil, the automatic transmission comprising:
   oil temperature detecting means configured to detect an oil temperature of the hydraulic oil; and
   control means configured to perform control of the speed ratio on a basis of the oil temperature obtained from the oil temperature detecting means, wherein
   the control means is configured such that:

when the control means has failed to obtain the oil temperature from the oil temperature detecting means due to an abnormality of the oil temperature detecting means, the control means outputs a command to restrict an output from the driving force source; and when the control means has obtained the oil temperature from the oil temperature detecting means after the oil temperature detecting means has recovered from the abnormality, the control means gradually cancels the command to restrict the output from the driving force source.

* * * * *